United States Patent [19]

Martin

[11] 4,347,757

[45] Sep. 7, 1982

[54] TELESCOPING STEERING SHAFT

[75] Inventor: Michael D. Martin, South Bend, Ind.

[73] Assignee: The Bendix Corporation, Southfield, Mich.

[21] Appl. No.: 205,532

[22] Filed: Nov. 10, 1980

[51] Int. Cl.³ .............................................. B62D 1/18
[52] U.S. Cl. ...................................... 74/493; 74/531; 403/371; 403/374
[58] Field of Search ................... 74/493, 531; 403/371, 403/374; 280/278, 279, 775

[56] References Cited

U.S. PATENT DOCUMENTS 3,276,287  10/1966  Albrecht .............................. 74/493
3,434,368  3/1969   Runkle ................................. 74/493

FOREIGN PATENT DOCUMENTS 823492  12/1951  Fed. Rep. of Germany ...... 403/374
44056   3/1917   Sweden .............................. 403/374
944287  12/1963  United Kingdom ................. 74/493

*Primary Examiner*—Allan D. Herrmann
*Attorney, Agent, or Firm*—Paul David Schoenle; Ken C. Decker

[57] ABSTRACT

A steering shaft (10) includes an outer shaft (12) defining a bore (14) telescopically receiving an inner shaft (16). The inner shaft defines resilient tangs (38) frictionally engageable with the outer shaft to prevent relative axial movement of the shafts. The tangs define a tapered recess (42) and a tapered member (44) is received in the recess. The tapered member movably engages the tangs to frictionally engage the tangs with the outer shaft. A key (46) carried by the tapered member extends radially outwardly between the tangs and is slidably received in a keyway (50) defined by the outer shaft to couple the shafts for rotation in unison. An elongated rod (52) coupled to the tapered member extends through a bore (36) in the inner shaft and threadably carries a nut (56) engaging the inner shaft. Rotation of the nut moves the tapered member engaging the tangs with the outer shaft and preventing relative axial movement of the inner and outer shafts.

13 Claims, 4 Drawing Figures

TELESCOPING STEERING SHAFT

The invention relates to a telescoping steering shaft for an automotive vehicle. A telescoping steering shaft, when incorporated into the steering column of an automotive vehicle, makes it possible for the operator of the vehicle to move the steering wheel axially with respect to the steering column.

Most automotive vehicles are provided with an adjustable seat so that the driver can obtain a comfortable position with respect to the control pedals of the vehicle, as determined by the length of the driver's legs. However, if the steering column can not also be adjusted, the position of the steering wheel with respect to the pedals is, more likely than not, unsatisfactory. Thus, a driver with long legs, after moving the seat rearward, may find the steering wheel too far away for comfort. On the other hand, a short-legged driver, after adjusting the seat to a forward position, may find that the steering wheel touches his body.

Accordingly, it is an object of this invention to provide a steering shaft which provides for axial movement of the steering wheel of an automotive vehicle.

An axially movable steering column is known in accordance with the U.S. Pat. No. 3,434,368, to Runkle in which the steering column includes a pair of telescoping shafts. One of the shafts is polygonal in cross section. The other shaft is tubular and includes a polygonal bore which coincides with the cross section of the first shaft. The steering wheel is drivingly connected to the one shaft. A steering gear is connected to the other shaft. Consequently, the telescoping shafts are able to rotatably transmit torque between the steering wheel and the steering gear of a vehicle. Additionally, the polygonal inner shaft includes a number of resilient tangs within the bore of the tubular shaft. A wedge member is received between the tangs to force the tangs into frictional engagement with the walls of the polygonal bore. An elongated rod extends through an axial bore in the inner polygonal shaft and carries a lever adjacent the steering wheel. The rod threadably engages the wedge member so that a vehicle operator can engage and disengage the tangs from the walls of the polygonal bore by rotating the elongated rod via the lever. Consequently, the telescoping shafts can be moved relative to one another to axially position the steering wheel according to the driver's preference. Additionally, the shafts may be engaged with each other in order to maintain a selected axial position for the steering wheel.

With a telescoping steering column of the kind illustrated in the Runkle patent, manufacturing of the steering column requires the formation of the polygonal shaft. Additionally, because tubular material is not generally available with a polygonal bore, a broaching operation is required to convert the circular bore of a thick-walled tube to a polygonal bore which coincides with the cross section of the polygonal shaft. The tubular outer shaft of the pair of telescoping shafts is made from the thick-walled tube. Consequently, the manufacture of a steering column according to the invention of Runkle involves many expensive machining operations.

The invention as claimed is intended to avoid the drawbacks of prior telescoping steering columns by providing a telescoping steering shaft wherein the major components are made from round tubing. The invention provides a telescoping steering shaft having a first round shaft which is received within a round bore in a second shaft. In order to torsionally couple the two shafts, the inner shaft has a number of resilient tangs within the bore of the outer shaft. A wedge member is movable between the tangs to force the tangs into frictional engagement with the wall of the bore. The wedge member includes a number of keys which project radially outwardly between the tangs of the inner shaft. The radially outer ends of the keys are received in axially-extending keyways formed in the bore of the outer shaft. One of the shafts is connected to a steering wheel. The other shaft is connected to a steering gear. Consequently, torque is transferred between the steering wheel and the steering gear via the radially-extending keys which engage the tangs of the inner shaft and the keyways of the outer shaft. An elongated rod is connected to the wedge member. The rod extends through an axial bore in the inner shaft and terminates in a threaded end adjacent the steering wheel. A lever having a threaded bore is carried on the threaded end of the rod. The lever engages the end of the inner shaft opposite from the wedge member. As a result, the wedge member is axially movable between the resilient tangs of the inner shaft by rotation of the lever on the threaded rod. In order to prevent the inner shaft from being withdrawn from the outer shaft, the end of the outer shaft adjacent the steering wheel has a pair of circumferential grooves extending radially inwardly from the outside of the shaft. The grooves are positioned radially outwardly from the axially-extending keyways. The depth of the grooves is such that the bottom of each groove intersects an axially-extending keyway. A resilient C-shaped ring is received in the pair of grooves so that the radially inner parts of the ring transect the pair of keyways. As a result, the radially-extending keys are engageable with the C-shaped ring to prevent the inner shaft from being withdrawn axially from within the outer shaft.

The advantages offered by the invention are mainly that the major components of the telescoping shaft are made from tubing having a circular cross-section; the inner shaft is torsionally coupled to the outer shaft by keys which extend radially outwardly between the tangs of the inner shaft and engage keyways on the outer shaft.

One way of carrying out the invention is described below with reference to drawings which illustrate only one specific embodiment, in which.

Figure 1:
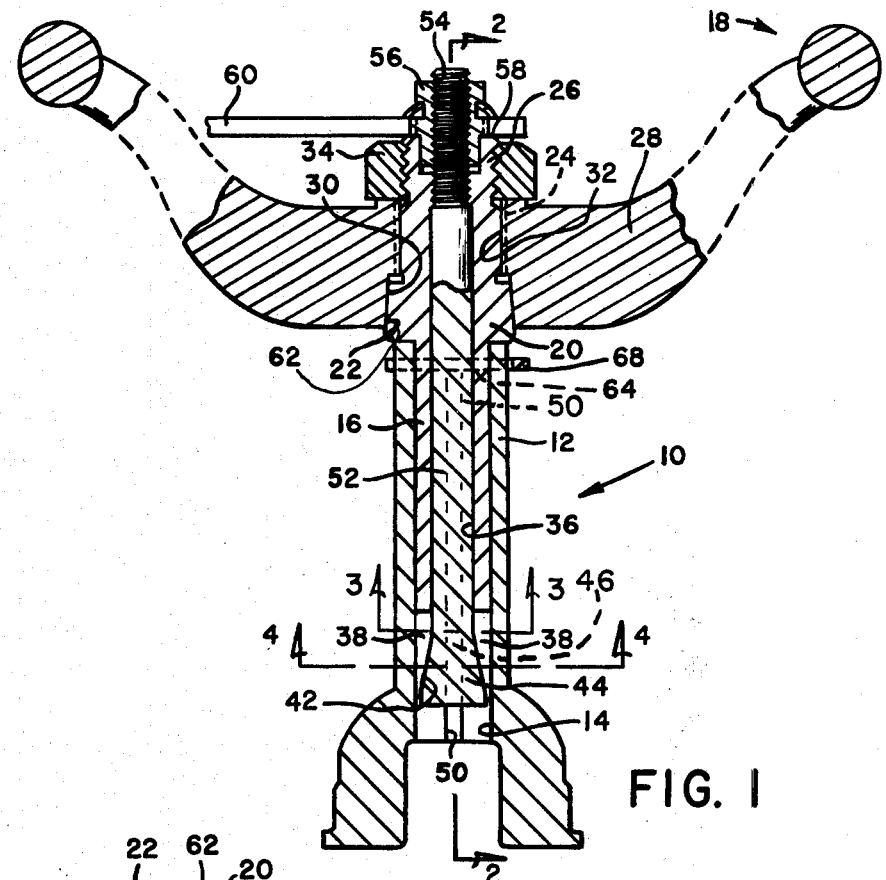
FIG. 1 is a partial, cross-sectional view of a telescoping steering shaft according to the invention.
Figure 2:
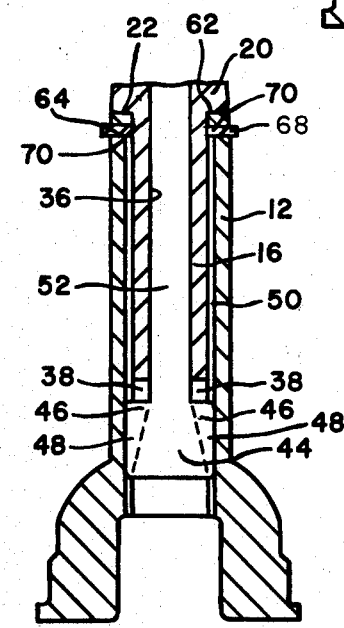
FIG. 2 is a partial, cross-sectional view taken along the line 2—2 of FIG. 1.
Figure 3:
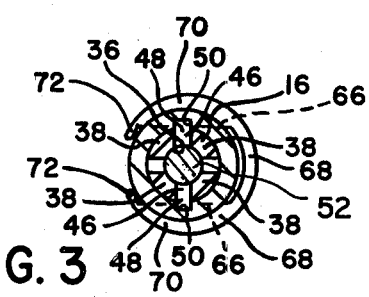
Figure 4:
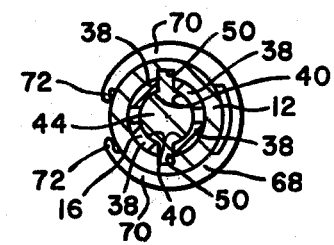

FIGS. 3 and 4 are cross-sectional views taken along the lines 3—3 and 4—4 of FIG. 1, respectively.

With reference to FIG. 1, a telescoping steering shaft 10 includes an elongated outer shaft 12 which defines a bore 14 therein. An elongated inner shaft 16 is slidably received in the bore 14. The upper end of shaft 16 carries and is drivingly connected to a steering wheel 18. The lower end of the shaft 12 is connectable to the steering gear (not shown) of an automotive vehicle.

In order to drivingly connect the steering wheel to the inner shaft 16, the inner shaft 16 includes a large diameter portion 20 which cooperates with the remainder of the shaft to define a shoulder 22. The large diameter portion 20 includes an axially-extending, splined portion 24 and a threaded stem 26. The hub 28 of steering wheel 18 includes a tapered bore 30, a portion of which is splined at 32 to drivingly engage the splines 24 of shaft 16. The hub 28 of steering wheel 18 is slidably received on the portion 20 of the inner shaft 16. A nut 34 threadably engages the stem 26 to retain the steering wheel 18 on the shaft 16.

FIGS. 3 and 4, it will be appreciated that the inner shaft 16 and the bore 14 in the outer shaft 12 are substantially circular in cross-section. The inner shaft 16 defines a through bore 36. The lower end of shaft 16, viewing FIGS. 1–4, includes four spaced apart axially-extending, resilient tangs 38, are axially tapered on their radially inner surface 40, so that the tangs 38 are able to flex radially. However, the tangs 38 are substantially inflexible in the circumferential direction. The tangs 38 cooperate to define an axially tapering cone-shaped recess or bore portion 42, viewing FIG. 1. A cone-shaped, wedge-defining member 44 is slidably received in the recess 42. The wedge-defining member 44 includes a pair of radially-extending keys 46 which extend radially outwardly between the tangs 38. The keys 46 terminate in ends 48 which are slidably received in axially-extending keyways 50 which are defined in the bore 14 of the outer shaft 12. Consequently, torque is transferred from the inner shaft 16 to the keys 46 via the circumferentially-rigid tangs 38. The keys 46 transfer torque to the outer shaft 12 via the axially-extending keyways 50.

An elongated rod 52 is integral with the wedge-defining member 44. The rod 52 extends axially through the bore 36 and terminates in a threaded end 54 which extends from the upper end of shaft 16 adjacent to the steering wheel 18, viewing FIG. 1. A nut 56 threadably engages the threaded end 54 of rod 52. Additionally, the nut 56 is engageable with a shoulder 58 defined at the upper end of the shaft 16. As a result, the wedge-defining member 44 can be drawn axially upward, viewing FIG. 1, between the radially-flexible tangs 38 by rotating the nut 56 on rod 52. A lever 60 is drivingly connected to the nut 58 so that a vehicle operator can move the wedge-defining member 44 between the tangs 38 by pivoting the lever 60 about rod 52, viewing FIG. 1. It will be apparent that moving the wedge-defining member 44 axially upward between the tangs 38 forces the radially-flexible tangs 38 outward into frictional engagement with the bore 14. Consequently, an operator may lock the shaft 16 in a selected axial position with regard to the outer shaft 12 by pivoting the lever 60 so as to draw the wedge-defining member 44 upward. Conversely, when the lever 60 is rotated in the opposite direction, the resilient tangs cause the wedge-defining member 44 and rod 52 to move axially downward, viewing FIGS. 1 and 2, so that the tangs 38 disengage from the bore 14. Consequently, the steering wheel 18 and shaft 16 are axially movable relative to the outer shaft 12.

The extent to which the shaft 16 can be moved axially into the shaft 12 is limited by the contact of the shoulder 22 with an abutment 62 which is defined at the upper end of the outer shaft 12. Additionally, the outer shaft 12 defines a pair of grooves 64 adjacent to the abutment 62. The grooves 64 are perpendicular to the axis of the shaft 12. Further, the grooves 64 are circumferentially arranged, viewing FIGS. 3 and 4, so that the floor 66 of the grooves transects the keyways 50. A resilient C-shaped retaining ring 68 is received in the grooves 64. The ring 68 includes spaced apart resilient legs 70 which extend circumferentially through the grooves 64 and terminate in radially-inwardly extending ends 72. The radially-inwardly extending ends 72 of ring 68 engage the shaft 12 so that the ring 68 is retained in the grooves 64. The legs 70 of ring 68 extend radially inwardly across the keyways 50. Consequently, the radially-extending keys 46 of wedge-defining member 44 are engageable with the legs 70 of ring 68 so as to limit the upward axial movement of the shaft 16 relative to the shaft 12. Of course, the ring 68 may be removed from the grooves 64 so as to allow axial removal of the shaft 16 from within the shaft 12.

From the foregoing, it will be apparent to those skilled in the art to which the invention pertains that the inner shaft 16 and the outer shaft 12 may be manufactured from tubing having a circular cross-section. The keyways 50 may be formed in the tube which is to become the outer shaft 12 by a simple broaching operation. The keyways 50 remove much less material from the tube than would be removed by the formation of a polygonal bore, as is required by the Runkle invention. Consequently, the torsional strength of the tube 12 is not significantly diminished by the keyways 50. Further, the broaching operation, which is needed to form the keyways 50, is relatively simple and inexpensive because of the small amount of material which must be removed in order to form the keyways 50. A further feature of the invention follows from the fact that the radially-extending keys 46 are employed to limit the upward axial movement of the inner shaft 16 relative to the outer shaft 12, viewing FIGS. 1 and 2. A further manufacturing advantage results from the integral formation of the wedge-defining member 44 with the rod 52. The rod 52 and wedge-defining member 44, with keys 46, may be made from inexpensive bar stock by a cold heading operation.

All in all, the invention provides a telescoping steering shaft which is inexpensive to manufacture. Consequently, the advantages of the invention may be available to a larger segment of the public than had prior telescoping steering shafts.

I claim:

1. A telescoping steering shaft comprising:
   a first elongated shaft defining an axially-extending bore therein, said bore being substantially circular and including an axially-extending keyway therein;
   a second elongated circular shaft received for reciprocation in said bore, said second shaft including spaced axially-extending, resilient tangs frictionally engageable with said first shaft;
   means engaging said tangs for moving said tangs into frictional engagement with said first shaft;
   a key extending radially outwardly between said tangs and slidably received in said keyway to couple said shafts for rotation in unison.

2. The invention of claim 1 wherein said moving means carries said key.

3. The invention of claim 1 wherein said tangs are axially tapered and cooperate to define an axially-tapering recess on said second shaft.

4. The invention of claim 3 wherein said moving means includes an axially tapered member shiftably received in said axially-tapering recess and means for axially shifting said axially tapered member to frictionally engage said tangs with said first shaft.

5. The invention of claim 4 wherein said second shaft defines a bore extending axially therethrough, said shifting means including an elongated rod connected at its one end to said axially-tapered member and having means at its other end for cooperating with said second shaft for axially shifting said rod and said axially tapered member relative said second shaft.

6. The invention of claim 5 wherein said cooperating means includes a portion of said elongated rod defining a screw thread and a nut threadably engaging said screw threaded portion, said nut being engageable with said second shaft.

7. The invention of claim 6 wherein said nut carries a lever drivingly connecting thereto.

8. The invention of claim 3 wherein said axially-tapering recess is substantially cone-shaped.

9. The invention of claim 4 wherein said axially tapered member is substantially cone-shaped.

10. The invention of claim 1 wherein said second shaft includes larger and smaller diameter portions defining a shoulder therebetween, said large diameter portion having a diameter greater than the diameter of said bore, one end of said first shaft defining an abutment engageable with said shoulder to limit the axial movement of said second shaft into said first shaft.

11. The invention of claim 1 wherein said first shaft includes abutment means for engaging said key to limit the axial movement of said second shaft out of said first shaft.

12. The invention of claim 11 wherein said first shaft defines a circumferentially-extending groove intersecting said keyway, said abutment means including a C-shaped ring received in said circumferentially-extending groove, said C-shaped ring including a circumferentially-extending leg received in said circumferentially-extending groove and extending radially inwardly across said keyway.

13. A telescoping steering shaft comprising a first elongated shaft defining a substantially circular axially-extending bore therein, a second elongated circular shaft slidably received in said bore, means for torsionally connecting said first and said second shafts while allowing axial movement of said shafts relative to each other, and means for frictionally engaging said first and said second shafts so as to substantially prevent relative axial movement of said shafts; characterized in that said torsional connecting means includes a pair of spaced apart axially-extending resilient tangs defined by said second shaft within said bore, an axially-extending keyway defined by said first shaft adjacent said second shaft, and a key extending radially between said pair of spaced apart tangs and axially movable in said keyway; sais frictional engaging means including an axially movable wedge-defining member engageable with said tangs to force said resilient tangs radially outwardly into frictional engagement with said first shaft, and means for axially moving said wedge-defining member.

* * * * *